C. W. MEINECKE.
IRRIGATOR RESERVOIR.
APPLICATION FILED DEC. 15, 1906.
1,127,483.
Patented Feb. 9, 1915.
2 SHEETS—SHEET 1.
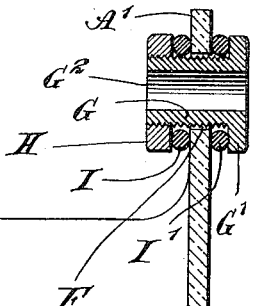
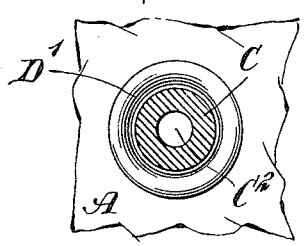
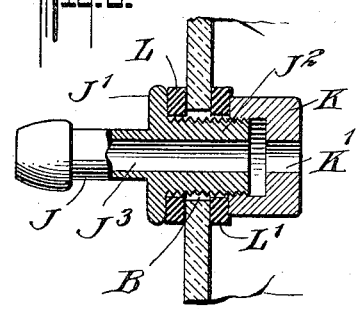
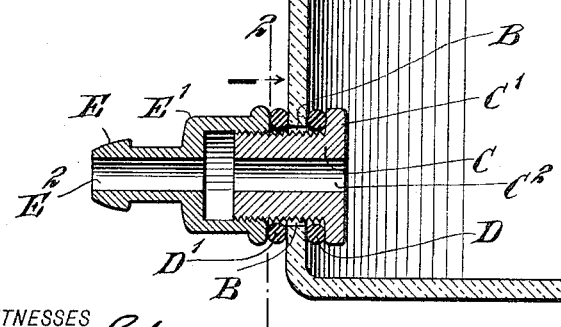
WITNESSES
INVENTOR
Christian W. Meinecke
BY
Briesen J Knauth
ATTORNEYS

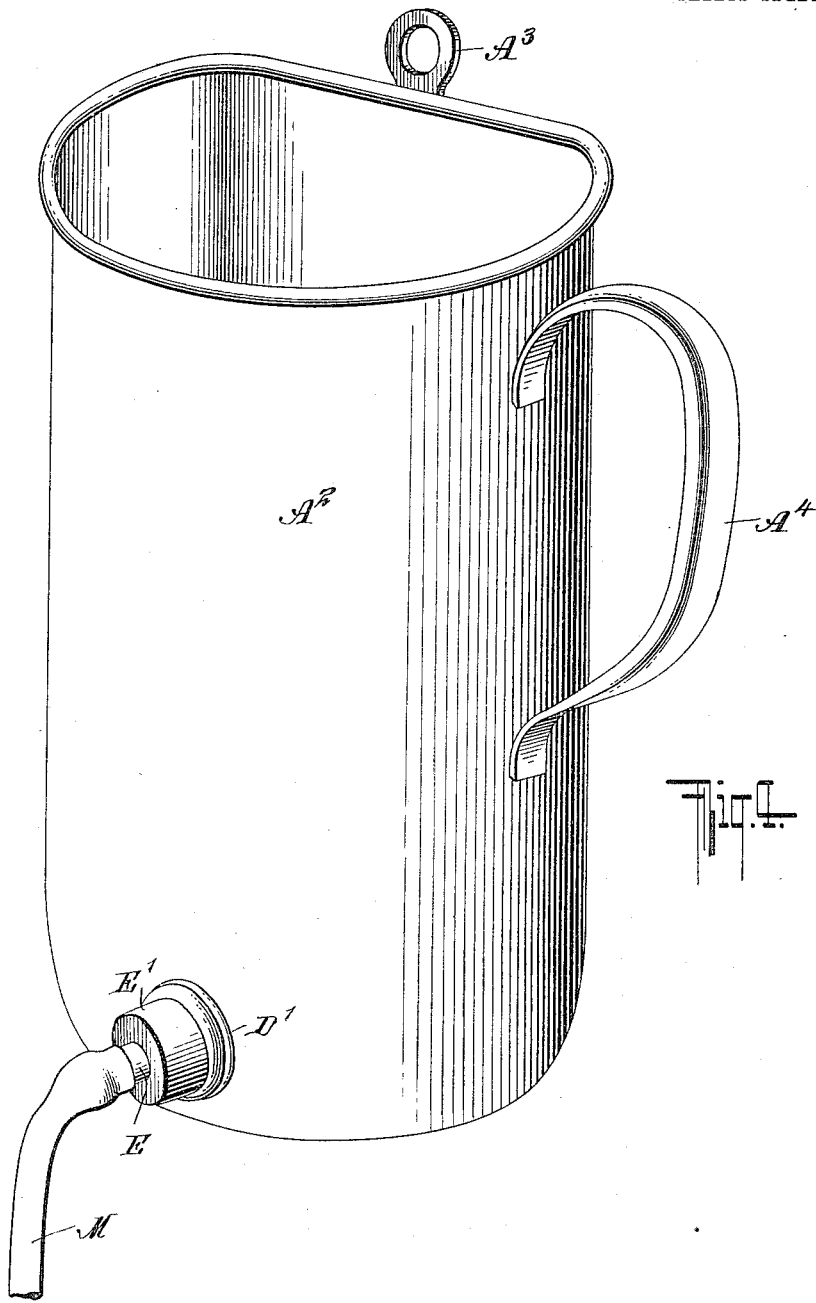

UNITED STATES PATENT OFFICE.

CHRISTIAN W. MEINECKE, OF JERSEY CITY, NEW JERSEY, ASSIGNOR TO WHITALL TATUM COMPANY, OF NEW YORK, N. Y., A CORPORATION OF NEW JERSEY.

IRRIGATOR-RESERVOIR.

1,127,483.

Specification of Letters Patent.

Patented Feb. 9, 1915.

Application filed December 15, 1906. Serial No. 347,937.

*To all whom it may concern:*

Be it known that I, CHRISTIAN W. MEINECKE, a citizen of the United States, and a resident of Jersey City, in the county of Hudson and State of New Jersey, have invented certain new and useful Improvements in Irrigator-Reservoirs, of which the following is a specification.

My invention relates to irrigator reservoirs and has for its object to provide a device of this kind with a detachable nipple, secured to the reservoir in a simple and water tight manner and also to provide reservoirs of this description with a detachable eyelet for supporting or hanging the reservoir in operative position.

Other objects of my invention will appear from the description following hereinafter and the features of novelty will be pointed out in the appended claim.

Reference is to be had to the accompanying drawings in which—

Figure 1 is a sectional view of an irrigator reservoir with my improvements applied thereto; Fig. 2 is a detail sectional view on the line 2—2 of Fig. 1; Fig. 3 is a sectional view of another form of nipple; and Fig. 4 is a perspective view of the complete reservoir.

In Figs. 1, 2 and 3 A represents the reservoir which may be made of metal, glass or any other suitable material and is provided at its lower portion with an opening B which may be located in the front wall or elsewhere.

C is a screw-threaded plug provided with a flange C′ and with a stem adapted to project through the opening B from the inside to the outside of the reservoir A. A washer D is located between the flange C′ of the plug C and the inner surface of the reservoir.

E is a nipple or spout adapted to receive the usual tube and provided with an enlarged nut portion E′ which is internally screw-threaded and is arranged to be screwed on the member C. A washer D′ similar to the washer D is situated between the nut portion E′ of the nipple E and the outer surface of the reservoir. With this construction as the nut portion E′ of the nipple E is screwed on to the plug C the said plug C and the nut are drawn together thus compressing the washers D and D′ and forming a perfect water tight joint at the outlet of the reservoir. The washers D and D′ also serve as cushions to prevent direct contact between the flange C′ of the plug C, the nut, and the walls of the reservoir A. This is important when the reservoir is made of glass as it prevents the edge of the opening B from being chipped if the parts are too tightly screwed together. The nut and the plug C are provided with central bores or perforations $E^2$ and $C^2$ respectively.

At its upper portion the reservoir A is provided with a projection A′ provided with an opening F for hanging or supporting the reservoir in operative position. To prevent damage to the opening A′ by the supporting medium I provide the said opening with an eyelet consisting of a screw threaded plug G having a flange G′ and a stem $G^2$ which is adapted to project through the opening F and to receive a nut H. Washers I, I′ are located respectively between the nut H and the one surface of the projection A′ and the flange G′ and the other surface of the said projection. These washers prevent direct contact between the projection A′ and the nut H and the flange G′, thus protecting the edge of the opening F. The plug G is provided with a central opening $G^2$ which may receive a supporting hook or be simply placed over a nail to support the reservoir.

In the form of nipple which I have shown in Fig. 3 the plug J is provided with a flange J′ and a screw-threaded stem $J^2$ which is adapted to project through the opening B of the reservoir toward the inside thereof. K is a nut adapted to be screwed on the projection $J^2$, and L and L′ are washers similar to the washers D and D′ and located between the flange J′ and the reservoir and the nut K and the reservoir respectively. The nut K has a central opening K′ and the plug J is provided with a central bore $J^3$. With my construction I thus secure a nipple and eyelet simple in construction and easy to secure in position and also easy to remove and also water tight.

A further advantage secured by my construction as described is that the nipple being detachable and being more easily broken than the vessel to which it is ordinarily affixed, can be easily replaced when necessary at comparatively small expense.

Perhaps the principal advantage of my improved irrigator reservoir is the ease and thoroughness with which it may be cleansed. Irrigator reservoirs of the general type described are principally used in hospitals and sick rooms and in proximity to sources of germs which it is imperative shall not be collected and transferred from one patient to another. Where nipples are permanently attached to the vessel, germs are apt to collect and be retained in angles and corners from which they are with difficulty removed. In the irrigator reservoir of my invention each part of the nipple can be separately and thoroughly sterilized as can also the vessel itself.

In Fig. 4 I have shown a reservoir $A^2$ made of enameled ware and provided with a projection $A^3$ for suspending it and with a handle $A^4$ for conveniently carrying it. The construction at the outlet is the same as illustrated in Fig. 1, and M designates the rubber tube connected with the nipple E.

I claim as my invention:

An irrigator reservoir comprising in combination with a vessel of rigid material having an outlet in its lower portion, a removable nipple comprising a perforated screw plug having a stem projecting through the outlet and also having a flange arranged on one side of the wall of said vessel, said stem having a diameter substantially less than the diameter of said outlet, a nut for said plug arranged on the other side of the wall of the vessel, and washers interposed between said nut and the wall of the vessel and between said wall and the flange of the plug, said washers being clamped against the wall of the vessel surrounding the outlet, for the purpose described.

In testimony whereof I have hereunto signed my name in the presence of two subscribing witnesses.

CHRISTIAN W. MEINECKE.

Witnesses:
JOHN LOTKA,
JOHN A. KEHLENBECK.

Copies of this patent may be obtained for five cents each, by addressing the "Commissioner of Patents, Washington, D. C."